INVENTORS
JOHN BADER
V. H. VAN BIBBER

BY
ATTORNEYS

July 11, 1961  J. BADER ET AL  2,991,747
HYDROFOIL RETRACTION AND STEERING MECHANISM
Filed May 29, 1959                          6 Sheets-Sheet 3

INVENTORS
JOHN BADER
V. H. VAN BIBBER

BY

ATTORNEYS.

July 11, 1961     J. BADER ET AL     2,991,747
HYDROFOIL RETRACTION AND STEERING MECHANISM
Filed May 29, 1959                                 6 Sheets-Sheet 5

INVENTORS
JOHN BADER
V. H. VAN BIBBER

BY

ATTORNEYS

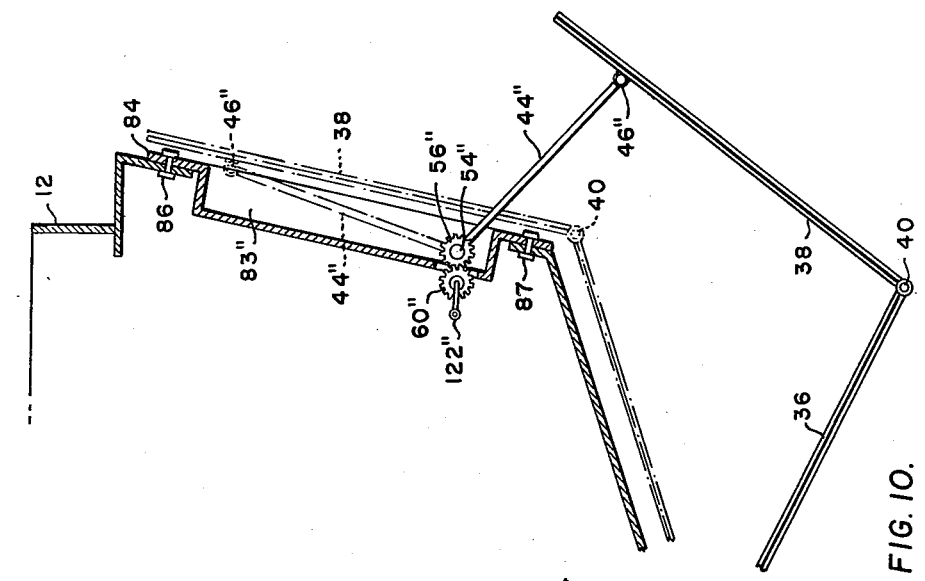
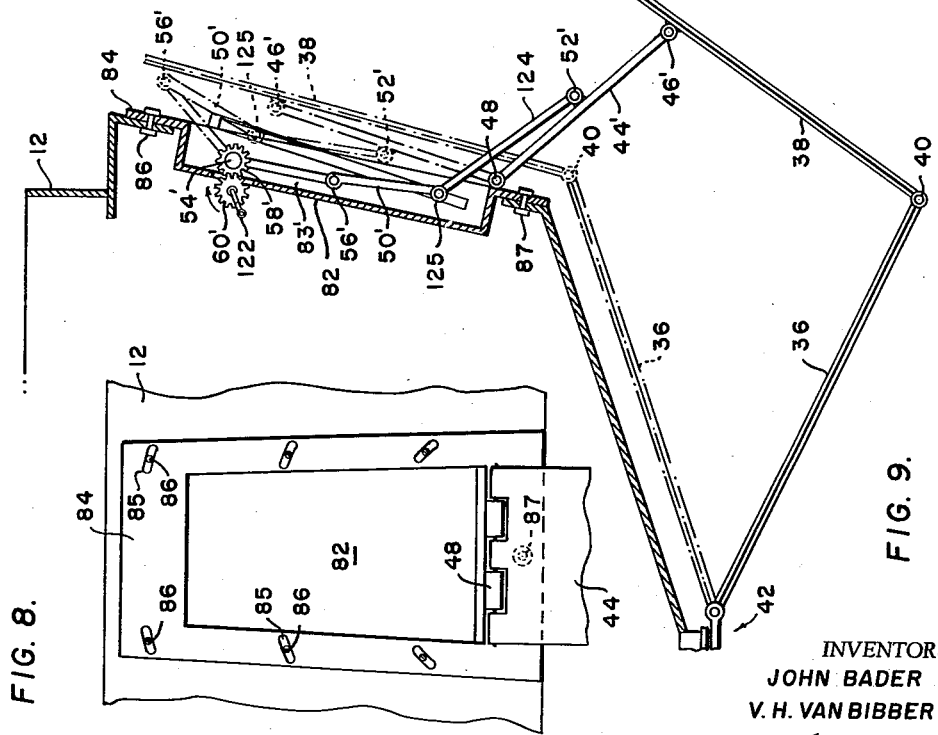

United States Patent Office
2,991,747
Patented July 11, 1961

2,991,747
HYDROFOIL RETRACTION AND STEERING
MECHANISM
John Bader, 2511 Woodley Road NW., Washington, D.C.,
and Vordaman H. Van Bibber, 314 Piedmont, Arlington, Va.
Filed May 29, 1959, Ser. No. 817,000
13 Claims. (Cl. 114—66.5)
(Granted under Title 35, U.S. Code (1952), sec. 266)

The invention described herein may be manufactured and used by or for the Government of the United States of America for governmental purposes without the payment of any royalties thereon or therefor.

This invention relates to hydrofoil craft and in particular it relates to retractable hydrofoils and to mechanisms for retracting and advancing such hydrofoils.

Various types of retractable hydrofoils and mechanisms for retracting such hydrofoils have been proposed. However, such hydrofoils and mechanisms are generally bulky, complicated and the so-called retractable hydrofoils still project well beyond the confines of craft's hull where they interfere with the necessary maneuvering of the boat alongside piers or other boats.

With the above deficiencies in view, a principal object of this invention is the provision of a hydrofoil system, whether fore or aft, that may be retracted to an inactive position substantially within the confines of the hull of a boat.

A further object of this invention is the provision of a mechanism for retracting and advancing hydrofoils and which mechanism is contained within the confines of the boat when the hydrofoils are retracted.

A further object of this invention is the provision of a craft having fore and aft hydrofoils and which hydrofoils are movable to active and inactive positions while the craft is traveling at full speed.

Another object of this invention is the provision of a hydrofoil craft wherein the angle of attack of the hydrofoils may be adjusted.

A further object of this invention is the provision of synchronizing mechanism for simultaneous movement of hydrofoils mounted on opposite sides of a craft.

A further object of this invention is the provision of a retractable hydrofoil system incorporating steering mechanism.

The invention, together with the above and other objects and advantages, is set forth in more technical detail in the following description and accompanying drawings in which like reference characters designate like parts throughout the several views and wherein:

FIG. 8 is a side elevational view, with parts omitted, of an outboard support and adjusting mechanism for the forward hydrofoils.

FIG. 9 is a transverse sectional view similar to FIG. 2, and showing a second embodiment of the forward foil retracting mechanism; and FIG. 10 is a transverse sectional view similar to FIG. 2, and showing a third embodiment of the forward foil retracting mechanism.

Figure 1:
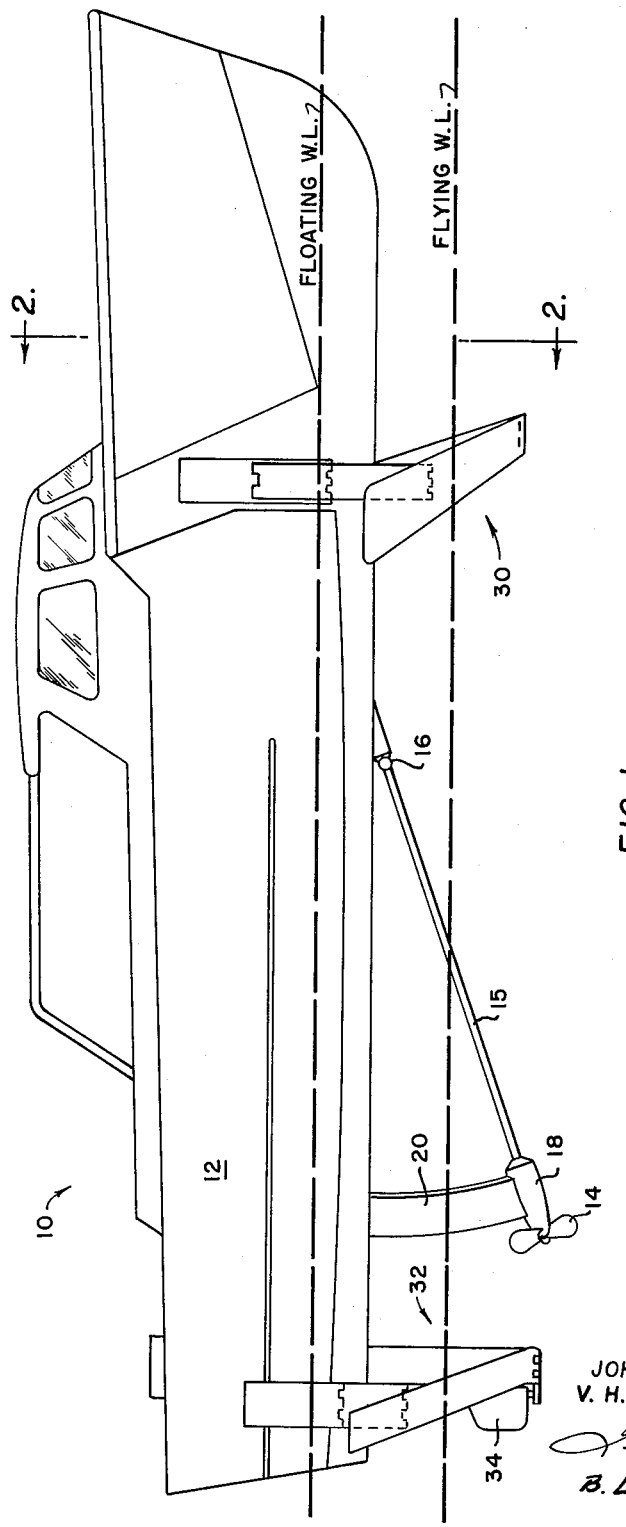
FIG. 1 is a side elevational view of a boat equipped with a hydrofoil system incorporating a preferred embodiment of the present invention.

Referring to FIG. 1 of the drawing, a preferred embodiment of the hydrofoil system of the invention is shown mounted on a more or less conventional boat 10 having a hull 12 driven by a retractable propeller 14, which propeller is mounted on a shaft 15 connected to a suitable source of power, not shown. So that the propeller may be raised and lowered, depending upon whether the hull is floating or flying, the shaft is provided with a swivel joint 16. The shaft is supported by a bearing 18 mounted on the lower end of a prop 20. The prop is mounted for vertical movement through a well in the hull and is operated by a suitable mechanism, not shown.

In accordance with this invention, the hydrofoil system comprises a pair of forward hydrofoils 30 and a pair of aft hydrofoils 32, each of which aft hydrofoil struts mounts a rudder 34, as will be described hereinafter. As shown in FIG. 1, and as described hereinafter, both the forward and aft hydrofoils are retractable. However, the retractable forward hydrofoils may be used with equal facility on a craft equipped with conventional, stationary aft hydrofoils.

Figure 2:
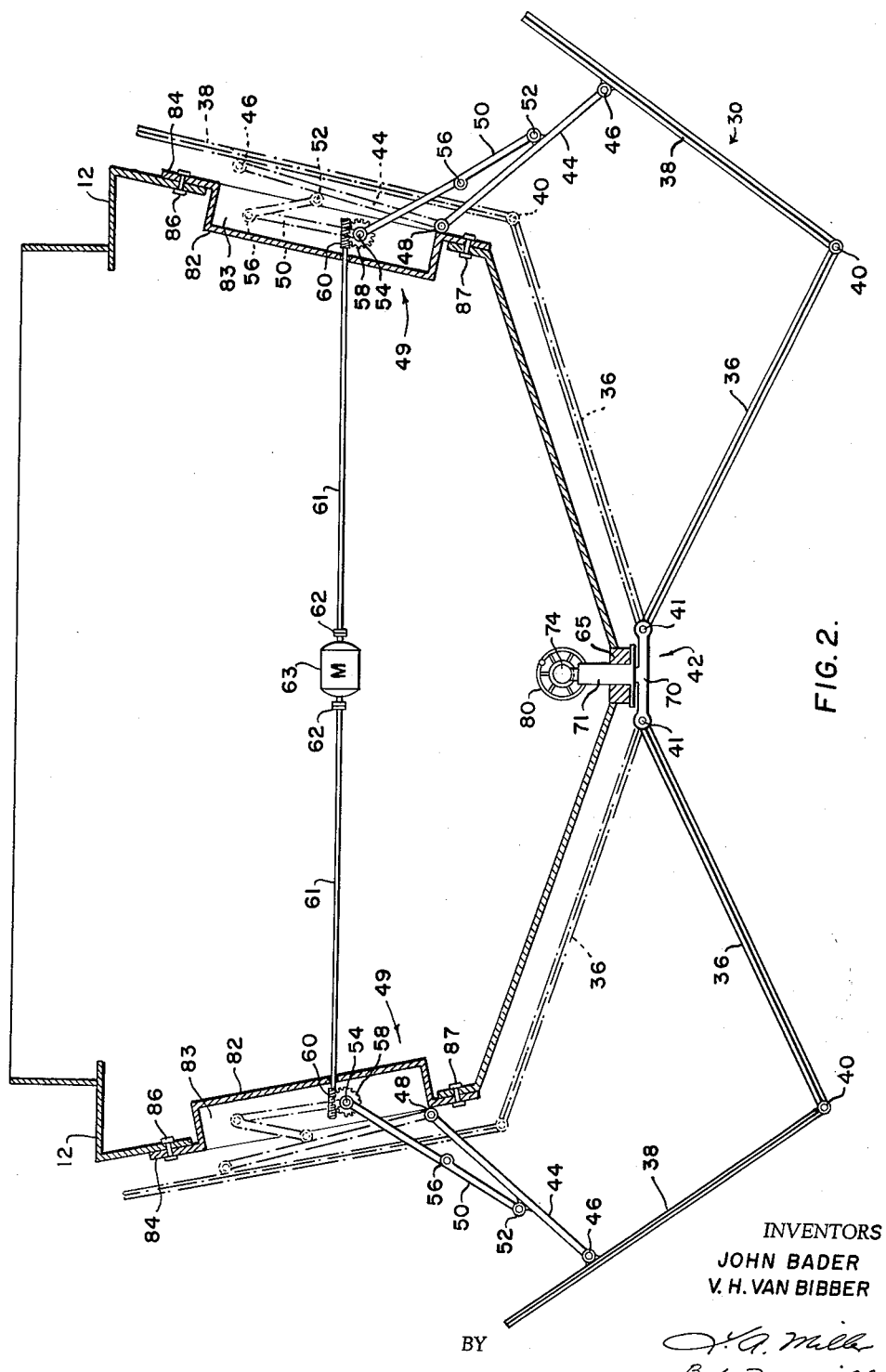
FIG. 2 is a transverse sectional view taken substantially on line 2—2 of FIG. 1.

Referring now to FIG. 2, the forward hydrofoils and operating mechanisms therefor are identical except for right and left handedness; therefore, only the right hand hydrofoil, as viewed in FIG. 2, will be described in detail. As shown, this forward hydrofoil comprises two surface piercing foils 36 and 38 hinged at their vertex 40 into a V-shaped hydrofoil. The inner foil 36 is hinged at 41 near the longitudinal centerline, keel, of the boat on a specially designed hinge and angle-of-attack adjusting mechanism 42, to be described in detail hereinafter. A streamlined strut 44 is hinged at 46 to the outer foil 38, outward of its longitudinal mid-point. The strut 44 serves to hold the hydrofoil in flying position as shown in full lines and to retract the hydrofoil to the retracted, broken-line position. The strut 44 is hinged at 48 pivoted near the chine of the boat on a special mounting and adjusting mechanism 49 to be described in detail hereinafter.

Referring still to FIG. 2, the retracting mechanism comprises a brace 50 hinged at its outer end 52 to the strut 44 outward of the center thereof, and at its inner end the brace is rigidly attached to a shaft 54, which shaft is mounted for rotation on the mechanism 49. As shown, the brace 50 is provided with an off-center hinge 56 near the middle thereof, which arrangement permits hinging upward, but prevents the brace from going beyond the straight, extended operating position, shown in full lines in FIG. 2. A gear 58 is fixed to shaft 54 and has a worm 60 in mesh therewith. The worm is mounted on the end of a shaft 61, which shaft is connected by a universal joint 62 to an electric motor 63.

For retracting the forward hydrofoils, the motor 63 is rotated in a given direction causing the shaft 54 to rotate in a counter-clockwise direction (FIG. 2) which in turn breaks the joint 56 in brace 50, pulling the brace upward. The lower end of the brace will in turn pull the strut 44 causing it to pivot at 48 and pull upward on the outer foil 38. This motion continues until the brace, strut, and outer foil are in contact with the side of the hull, with the brace folded into a recess 83 built into the mechanism 49. Also, because of the hinge connections 40 and 41, the inner foil 36 is pulled into contact with the bottom of the hull, as shown in broken lines in FIG. 2. By reversing the rotation of the motor 63, the hydrofoil is lowered in the reverse manner and locked in the downward, full line, position by a suitable brake or locking mechanism, not shown, on shaft 54. Retraction of the port and starboard hydrofoils is synchronized by use of the common motor 63. However, separate motors, hand cranks, or hydraulic cylinders may be used for separately raising and lowering the forward hydrofoils, in which case the forward hydrofoils may be used for banking the craft and be synchronized with the rudders to be described hereinafter.

Figure 3:
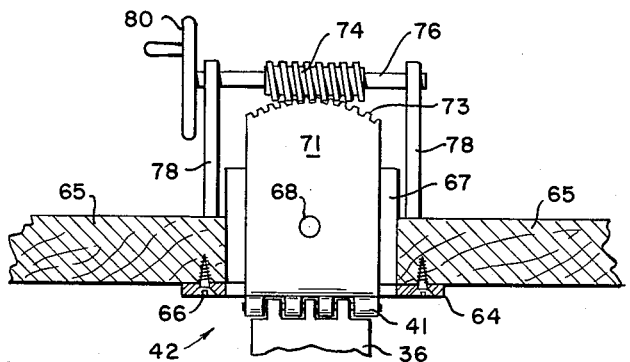
FIG. 3 is a centerline side elevational view of a hinge and angle of attack adjusting mechanism shown in FIG. 2.
Figure 4:
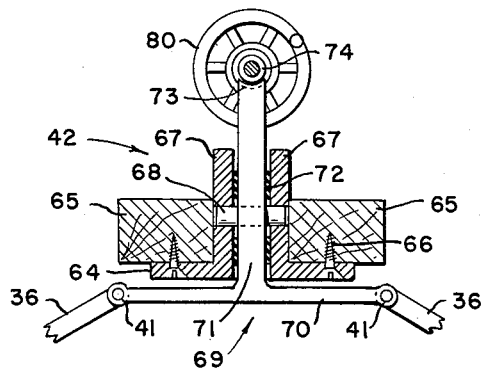
FIG. 4 is a transverse section of the hinge and adjusting mechanism shown in FIG. 3.
Figure 5:
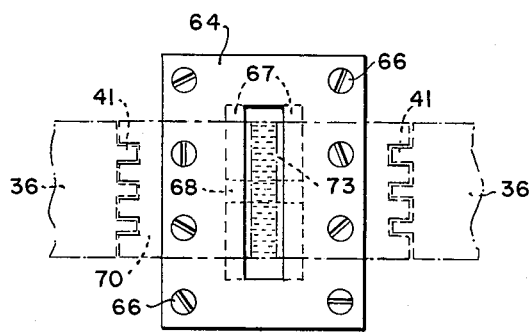
FIG. 5 is a bottom plan view of the hinge and adjusting means shown in FIG. 3.

The angle of attack adjusting mechanism and hinge support 42 for the inner ends of the forward hydrofoils, FIGS. 3, 4 and 5, comprises a casting 64 attached to a pair of keel blocks 65 by a plurality of screws 66. The casting 64 is formed with a pair of uprights 67 (FIG. 4) drilled to mount a pivot pin or shaft 68, which shaft pivotally mounts an inverted T-shaped member 69. Member 69 is formed with a base 70, on which the foils 36 are hinged as at 41, and an upright 71 that is pivoted on the shaft 68. As shown in FIG. 4, the upright 71 of the inverted T-member is mounted between the pair of uprights 67 of casting 64 and suitable packing 72, for rendering the mechanism watertight, is located between the uprights.

A gear segment 73 (FIG. 3) is formed on the upper end of the upright 71 and is in mesh with a worm gear 74. The worm gear is attached to a shaft 76 mounted for rotation in a pair of uprights 78, and the shaft 76 is provided with a hand wheel 80 on one end thereof. The arrangement is such that rotation of the wheel 80 in one direction causes rotation of the upright 71 in one direction about the shaft 68 to increase the angle of attack of the hydrofoils 36, whereas, rotation of the wheel 80 in the opposite direction causes the upright 71 to rotate in an opposite direction to thereby decrease the angle of attack of the hydrofoils.

Referring again to FIG. 2 and to FIG. 8, the mechanisms 49 for mounting the outboard ends of the forward hydrofoils and for adjusting the angle of attack from these ends of the hydrofoils comprises a pair of box-like castings 82 fitted into openings in opposite sides of the hull 12 and forming the recess 83, referred to hereinbefore, for the retracting mechanisms. For clarity of illustration, only the hinged end 48 of strut 44 of the retracting mechanism is shown in FIG. 8. Each of the castings 82 is formed with a peripheral flange 84 provided with a plurality of arcuate openings or slots 85 in the sides and top thereof for receiving a like number of bolts 86. At the bottom, the casting is pivoted to the hull by a pivot pin 87. As shown in FIGS. 2 and 8, the upper hinge 48 of strut 44 is attached to the casting 82.

The foil support and adjusting mechanisms 49 for the outboard ends of the hydrofoils is used in conjunction with the inboard support and adjusting mechanism 42. That is, when it is necessary or desirable to adjust the angle of attack of the forward hydrofoils, the mechanism 42 is manipulated in the manner described hereinbefore, and, at the same time that this adjustment is made, the bolts 86 are loosened and casting 82 is manually moved forward or aft about the pivot pin 87 to a new position corresponding with the movement of the adjusting mechanism 42 and then the bolts 86 are tightened to secure the casting in its new position. The amount of movement given the mechanisms 49 is relatively small so that the universal joints 62 in the retracting shafts 61 permit such movement. The adjustment of the angle of attack of the hydrofoils is intended to give optimum operating conditions in line with the load and speed for which the craft is designed; it is not intended that the adjustment be made during flight.

Figure 6:
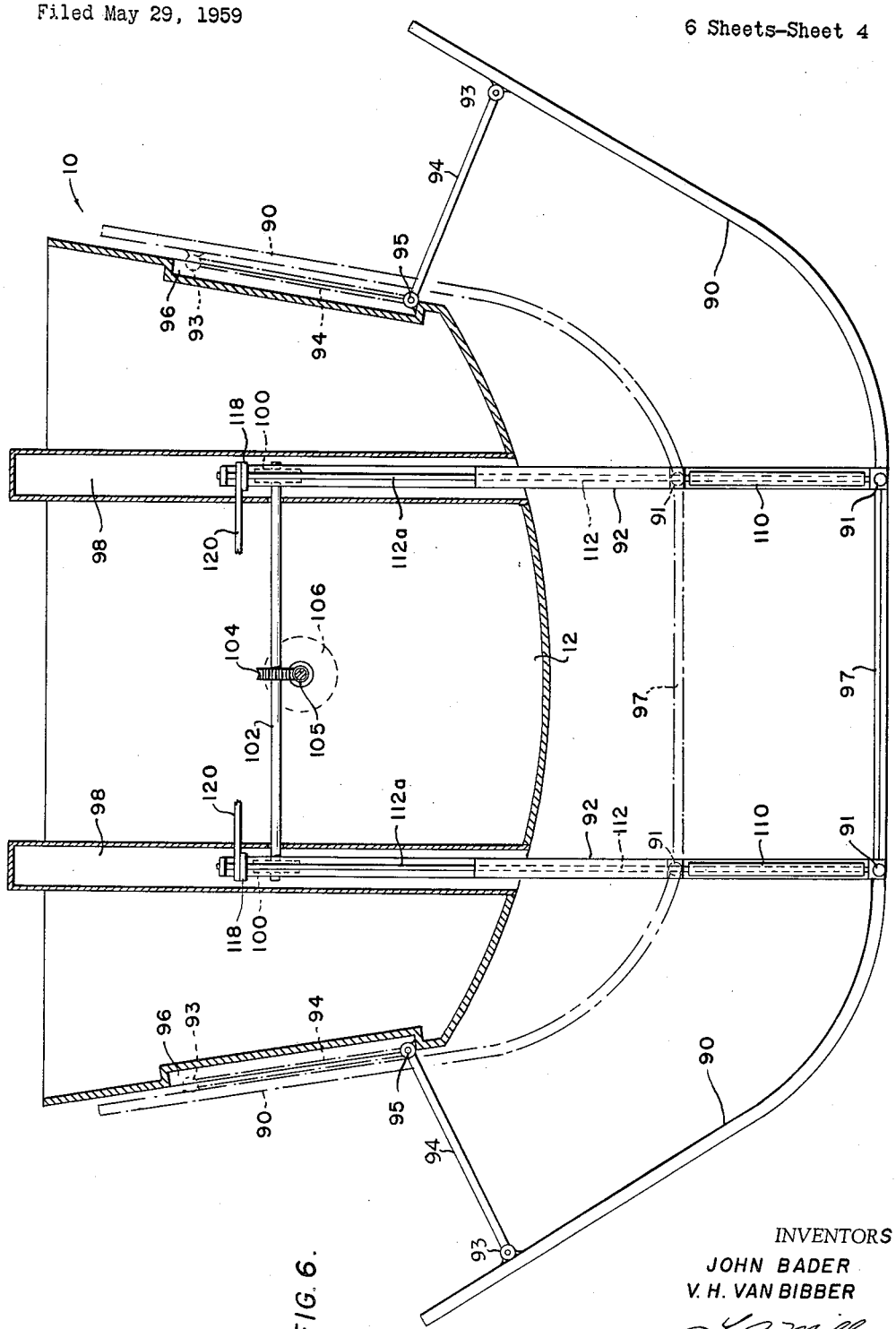
FIG. 6 is a rear elevational view, partly in section, of the boat shown in FIG. 1.
Figure 7:
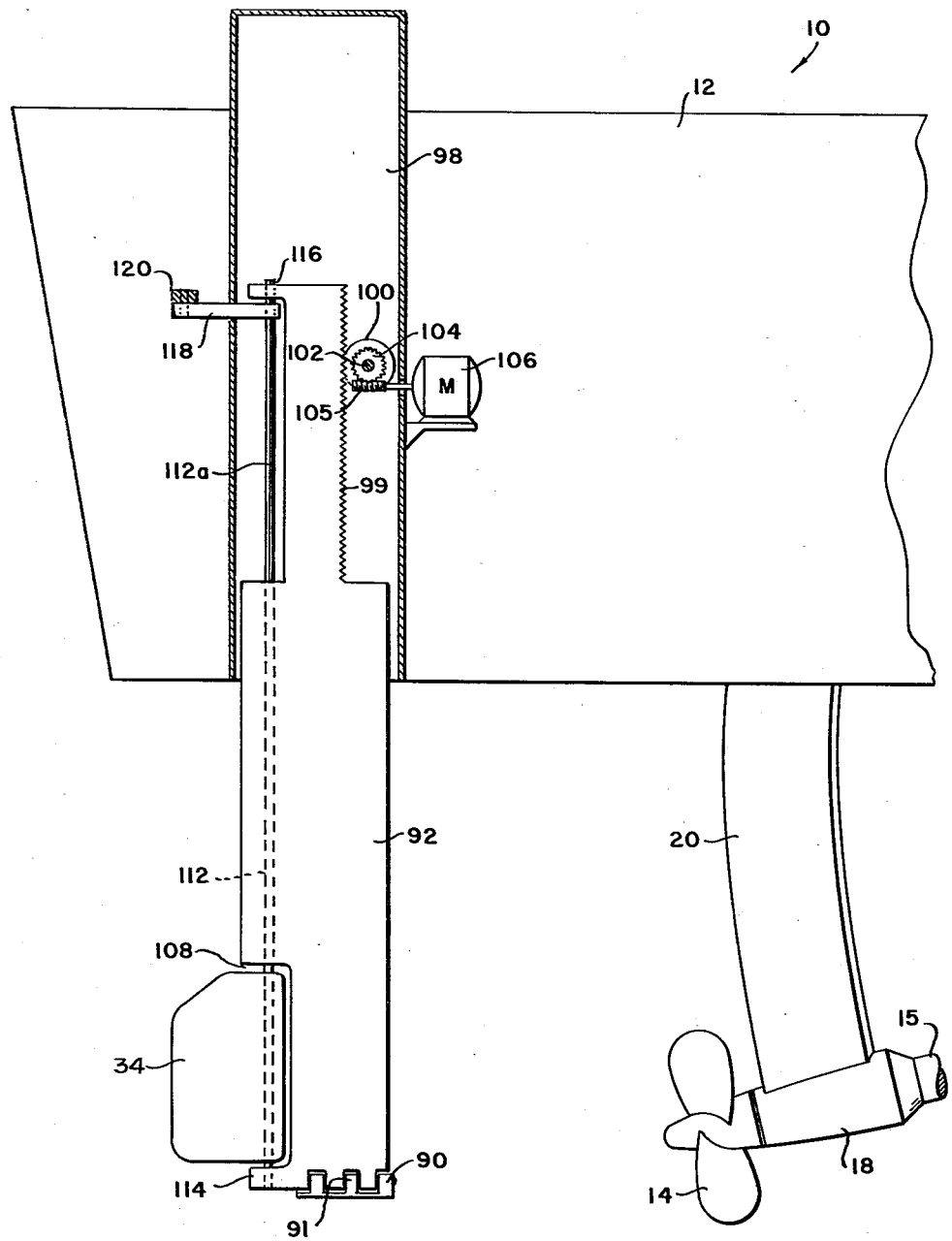
FIG. 7 is a sectional side elevation of the stern portion of the boat shown in FIG. 1, and showing the stern hydrofoil-rudder system.

Referring now to FIGS. 6 and 7, in accordance with this invention, the aft hydrofoil system 32 comprises a pair of foils 90, each hinged at its inner end 91 to the bottom of a vertical strut 92, and each hinged at its upper end at 93 to one end of a brace 94, the opposite end of which brace is pivoted at 95 within the lower portion of a recess 96 in the side of the hull near the stern. As shown in FIG. 6, the struts 92 are connected by a horizontal brace or foil 97. The struts 92 are mounted for vertical movement in a pair of wells 98 and are formed with a rack 99 (FIG. 7) on an upper portion thereof. A pair of gears 100, mounted on opposite ends of a shaft 102, mesh with the racks. A third gear 104 is fixed to the shaft 102 and is in mesh with a worm gear 105 mounted on the shaft of an electric motor 106.

The struts 92 are streamlined and are each formed with a recess 108 (FIG. 7) in the lower aft portion thereof, into which recess is fitted a rudder 34. Each of the rudders is fixedly mounted on a vertical shaft 112 having bearings 114 and 116 at its lower and upper ends in the strut. An upper portion 112a of each of the shafts is square in section and has a crank arm 118 slidably mounted thereon. The crank arms are connected by links 120 to a common lever or bell crank, not shown. The arrangement is such that movement of the common lever in one direction rotates the shafts 112 and attached rudders in that direction, whereas, movement of such lever in an opposite direction rotates the rudders in the opposite direction, to thereby steer the craft.

Retraction of the aft hydrofoils is accomplished by energizing the motor 106 for rotation in a given direction whereby the gears 100 are rotated clockwise (FIG. 7), whereupon the racks 99, struts 92 and attached rudders are elevated. The splined connections between the square portions 112a of the rudder shafts and the crank arms 118 permits the struts and attached shafts to move vertically relative to the crank arms. As the struts are moved upward within the wells and relative to the hull of the boat, the hinged connections 91 (FIG. 6) between the hydrofoils and the bottom of the struts, between the hydrofoils and the braces 94 and between the braces 94 and the side of the hull permit the hydrofoils to move upward and inward relative to the bottom and sides of the hull from the full line position to the broken line position shown in FIG. 6. Lowering of the aft hydrofoils is accomplished by reversing the direction of rotation of the motor 106.

In practice, the motor 106 for raising and lowering the aft hydrofoils and the rudders may be wired in series and synchronized with the motor 62 (FIG. 2) for raising and lowering the forward hydrofoils, whereby the aft and forward hydrofoils may be raised and lowered in unison. Also, as pointed out hereinbefore, the forward hydrofoils may be used as an aid in banking the craft in which case the forward hydrofoils may be arranged for raising and lowering independently of each other and the independent raising and lowering of the forward hydrofoils may be synchronized with the operation of the rudders.

Referring now to FIG. 9, this second embodiment or arrangement of the forward hydrofoils is generally similar to that shown in FIG. 2, except for the retracting mechanism. As shown in FIG. 9, the retracting shaft 54' is mounted in the upper portion of the recess 83' in the casting 82. The gear 58' that is keyed to shaft 54' is driven by a gear 60' having a crank 122 attached thereto, and an additional link or arm 124 is connected between the lower end of the brace 50' and the strut 44'. Arm 124 is hinged to brace 50' at 125 and to strut 44' at 52'.

In retracting the forward hydrofoils in the FIG. 9 embodiment, the crank 122 is rotated in a clockwise direction whereupon the gear 58' and shaft 54' are rotated counterclockwise with the result that the joint 56' in brace 50' is broken, pulling up the link 124, strut 44' and the outer and inner foils 38 and 36 into the broken line positions shown in FIG. 9. The support and angle of attack mechanisms 42 and 49 of the FIG. 9 embodiment are the same as those of the FIG. 2 embodiment, described above, and need not be again described.

FIG. 10 illustrates a third embodiment of a retracting mechanism which is relatively simple and is intended for use with small boats having relatively light hydrofoils. Here the strut 44″ is attached directly between the outer foil 38 and the shaft 54″. The gear 56″, attached to shaft 54″, may be rotated by a simple gear and crank, the same as in the FIG. 9 embodiment, or the motor and shaft arrangement shown in FIG. 2 may be used.

With the FIG. 10 embodiment, rotation of the shaft 54″ counter-clockwise causes the strut 44″ to swing upward in a counter-clockwise direction, which in turn pulls the outer and inner foils upward from the full line position to the broken line position shown in FIG. 10.

It should be understood, of course, that the foregoing disclosure relates to only preferred embodiments of the invention and that numerous modifications or alterations may be made therein without departing from the spirit and the scope of the invention as set forth in the appended claims.

What is claimed is:

1. A hydrofoil craft comprising a hull having a keel, a bottom and sidewalls, a pair of substantially V-shaped, surface-piercing hydrofoils mounted on the hull and extending transversely beneath the bottom thereof, each of said V-shaped hydrofoils including an inboard foil having an inboard end thereof pivotally mounted on the hull near the keel, an outboard foil having an outboard end thereof pivotally mounted from the side of the hull and means hingedly connecting the outboard end of the inboard foil to the inboard end of the outboard foil whereby the V-angle between the foils may be varied.

2. A hydrofoil craft as set forth in claim 1 which additionally includes retracting mechanisms mounted on opposite sides of the hull and connected to the outboard foils near the outboard end thereof for changing the V-angle between the foils which raise and lower the hydrofoils relative to the hull of the craft.

3. A hydrofoil craft as set forth in claim 2 which additionally includes means for adjusting the angle of attack of the hydrofoils.

4. A hydrofoil craft comprising a hull having a longitudinal axis, a bottom and opposite sides, a pair of substantially V-shaped, surface-piercing hydrofoils mounted on the hull beneath the bottom and sides thereof with one such hydrofoil mounted on opposite sides of the longitudinal axis, and mechanism mounting the hydrofoils on the craft, said mounting mechanism including a hinge plate mounted on the bottom of the hull on the longitudinal axis thereof and having hinge connections on opposite sides of said longitudinal axis, and said hydrofoils each including an inboard foil having an inboard end thereof hingedly connected to the hinge connection of the hinge plate on its side of the hinge plate, and an outboard foil having an outboard end thereof hingedly connected to the side of the hull and hinge means connecting the outboard end of the inboard foil to the inboard end of the outboard foil.

5. A hydrofoil craft as set forth in claim 4 which additionally includes mechanism mounted on said hull and linked to said outboard hydrofoils for raising and lowering the hydrofoils from an active position spaced appreciably below the bottom and sides of the hull to an inactive position substantially in contact with the bottom and sides of the hull.

6. A hydrofoil craft as set forth in claim 5 wherein said retracting mechanism includes a pair of braces mounted on opposite sides of the hull and connected to the respective hinge connection of the outboard foils and mechanism for operating said braces.

7. A hydrofoil craft as set forth in claim 6 wherein the mechanism for operating the retracting braces includes a single power mechanism operatively connected to said levers for raising and lowering said hydrofoils in unison.

8. A hydrofoil craft as set forth in claim 4 wherein the mounting mechanism for the hydrofoils additionally includes mechanism for adjusting the angle of attack of the hydrofoils, said latter mechanism including means pivotally mounting the hinge plate for movement on a horizontal axis substantially perpendicular to the longitudinal axis of the hull.

9. A hydrofoil craft comprising a hull having a central longitudinal axis, a bottom and opposite sides, a pair of substantially V-shaped, surface-piercing hydrofoils and mechanism mounting the hydrofoils beneath the bottom of the hull, one on each side of the central longitudinal axis thereof, said mounting mechanism including means mounting the hydrofoils on an axis substantially parallel to the central longitudinal axis for folding the hydrofoils substantially into contact with the bottom and sidewalls of the hull and on an axis substantially perpendicular to the central longitudinal axis of the hull for adjusting the angle of attack of the hydrofoils.

10. A hydrofoil craft comprising a hull having a longitudinal axis, a bottom and opposite sidewalls, a pair of struts mounted on the hull for vertical movement between an upper and a lower position relative to the hull, said struts being spaced transversely of the hull with one such strut on each side of the said longitudinal axis, a hydrofoil mounted on each of the struts for movement therewith and relative thereto, each of said hydrofoils including a foil member having an inboard end thereof pivotally mounted on its respective strut at the bottom thereof and a link having one end thereof pivotally mounted on one sidewall of the hull and an opposite end thereof pivotally connected to the foil near an outboard end of such foil, and means for raising and lowering said struts and attached hydrofoils from an active position appreciably below the bottom of the hull to an inactive position near the bottom and sidewalls of the hull.

11. A hydrofoil craft as set forth in claim 10 wherein the opposite sidewalls of the hull are provided with recessed portions in transverse alignment with the struts and attached hydrofoils and wherein the struts, foils and links are so connected that the links are moved into the recessed portions of the hull with the outboard ends of the foils substantially in contact with the sidewalls in the inactive position of the hydrofoils.

12. A hydrofoil craft as set forth in claim 10 which additionally includes a rudder mounted on each of the struts for movement therewith and relative thereto.

13. A hydrofoil craft as set forth in claim 12 which additionally includes mechanism for moving said rudders relative to the struts, said mechanism including a pair of substantially vertical shafts each having a lower end thereof fixedly attached to one of the rudders and journaled in the bottom of one of the struts and an upper end journaled in the top of the said strut, a crank arm mounted on the upper end of the shaft and linkage connecting said crank arms for simultaneous operation thereof.

References Cited in the file of this patent

UNITED STATES PATENTS

| | | |
|---|---|---|
| 2,713,317 | Herz | July 19, 1955 |
| 2,720,180 | Von Schertel | Oct. 11, 1955 |
| 2,749,870 | Vavra | June 12, 1956 |
| 2,749,871 | Scherer et al. | June 12, 1956 |

FOREIGN PATENTS

| | | |
|---|---|---|
| 517,519 | Germany | Feb. 4, 1931 |
| 572,413 | Great Britain | Oct. 8, 1945 |
| 575,883 | Germany | May 4, 1933 |